United States Patent
Patil et al.

(10) Patent No.: US 8,743,763 B2
(45) Date of Patent: Jun. 3, 2014

(54) USER DEVICE DORMANCY

(75) Inventors: Kiran KishanRao Patil, Hyderabad (IN); Suresh Sanka, Hyderabad (IN); Sathish Krishnamoorthy, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 443 days.

(21) Appl. No.: 13/019,798

(22) Filed: Feb. 2, 2011

(65) Prior Publication Data

US 2012/0020393 A1    Jan. 26, 2012

Related U.S. Application Data

(60) Provisional application No. 61/367,160, filed on Jul. 23, 2010.

(51) Int. Cl.
*H04W 52/02* (2009.01)
*H04W 76/04* (2009.01)
*H04W 76/06* (2009.01)

(52) U.S. Cl.
CPC .......... *H04W 76/046* (2013.01); *H04W 76/068* (2013.01); *H04W 52/0235* (2013.01); *H04W 52/0209* (2013.01)
USPC ...................... 370/311; 455/343.1; 455/343.6

(58) Field of Classification Search
CPC .......... H04W 76/046; H04W 52/0257; H04W 76/00; H04W 76/06; H04W 76/068; H04W 76/062; H04W 52/209; H04W 52/0235
USPC ................. 370/310, 311, 328, 331, 252, 338; 455/9, 418, 343.1–343.6
See application file for complete search history.

(56) References Cited

U.S. PATENT DOCUMENTS 6,249,681 B1 * 6/2001 Virtanen ........................ 455/466
6,882,632 B1 * 4/2005 Koo et al. ...................... 370/335

(Continued)

FOREIGN PATENT DOCUMENTS

| JP | H11313370 A | 11/1999 |
| JP | 2006515491 A | 5/2006 |

(Continued)

OTHER PUBLICATIONS

Ericsson et al: "Clarifications on Fast Dormancy", 3GPP Draft; R2-095713, 3rd Generation Partnership Project (3GPP), Mobile Competence Centre; 650, Route Des Lucioles; F-06921 Sophia-Antipolis Cedex; France, no. Miyazaki; Oct. 12, 2009, XP050390218, [retrieved on Oct. 6, 2009] p. 1, paragraph 1—p. 2, paragraph 2.3.

(Continued)

*Primary Examiner* — Asad Nawaz
*Assistant Examiner* — Wutchung Chu
(74) *Attorney, Agent, or Firm* — S. Hossain Beladi

(57) ABSTRACT

In a particular embodiment, a method includes sending a message from a communication device to a radio network controller. The message indicates that a data session has ended. The data session is supported by a wireless channel between the communication device and the radio network controller. After a time period following the sending of the message, a second message is selectively sent to the radio network controller. The second message indicates that the data session has ended. The second message is selectively sent based at least in part on whether a measurement indicates that data was communicated via the wireless channel during the time period.

25 Claims, 7 Drawing Sheets

(56) References Cited

U.S. PATENT DOCUMENTS

| | | | |
|---|---|---|---|
| 7,123,617 B1* | 10/2006 | Abrol | 370/394 |
| 7,283,818 B2* | 10/2007 | Rajkotia et al. | 455/434 |
| 2001/0029188 A1* | 10/2001 | Sarkkinen et al. | 455/517 |
| 2003/0039225 A1 | 2/2003 | Casati et al. | |
| 2004/0053619 A1* | 3/2004 | Kim et al. | 455/445 |
| 2004/0156338 A1* | 8/2004 | Pasanen et al. | 370/331 |
| 2008/0039094 A1* | 2/2008 | Jeong et al. | 455/436 |
| 2008/0253312 A1* | 10/2008 | Park | 370/311 |
| 2008/0285493 A1* | 11/2008 | Tseng | 370/310 |
| 2009/0176495 A1* | 7/2009 | Beming et al. | 455/436 |
| 2009/0228602 A1* | 9/2009 | Speight et al. | 709/236 |
| 2010/0062781 A1 | 3/2010 | Dolganow et al. | |
| 2010/0118752 A1* | 5/2010 | Suzuki et al. | 370/311 |
| 2011/0212742 A1* | 9/2011 | Chen et al. | 455/507 |
| 2011/0222457 A1* | 9/2011 | Lee et al. | 370/312 |
| 2011/0230192 A1* | 9/2011 | Tiwari | 455/436 |
| 2011/0269463 A1* | 11/2011 | Wang et al. | 455/436 |
| 2011/0319064 A1* | 12/2011 | Lenart et al. | 455/418 |
| 2012/0220299 A1* | 8/2012 | Sharma et al. | 455/436 |
| 2012/0281561 A1* | 11/2012 | Shukla et al. | 370/252 |

FOREIGN PATENT DOCUMENTS

| | | | |
|---|---|---|---|
| JP | 2012508533 A | 4/2012 | |
| WO | WO2010054391 A2 | 5/2010 | |

OTHER PUBLICATIONS

International Search Report and Written Opinion—PCT/US2011/045108—ISA/EPO—Jan. 27, 2012.

Research in Motion Limited et al: "Fast Dormancy: A way forward", 3GPP Draft; R2-085134, 3rd Generation Partnership Project (3GPP), Mobile Competence Centre ; 650, Route Des Lucioles ; F-06921 Sophia-Antipolis Cedex; France, no. Prague, Czech Republic; 20080923, Sep. 23, 2008, XP050320063, [retrieved on Sep. 23, 2008] p. 1, line 22-line 29.

Research in Motion Ltd: "Modification to Fast Dormancy in PCH States", 3GPP Draft; R2-101441__25331-910__CRXXXX__(REL-9)__FASTD0R Mancy PCH Restrict, 3rd Generation Partnership Project (3GPP), Mobile Competence Centre; 650, Route Des Lucious; F-06921 Sophia-Antipolis Cedex; France, vol. RAN WG2, no. San Francisco, USA; 20100222, Feb. 15, 2010, XP050421681, [retrieved on Feb. 15, 2010], p. 1, line 1-line 26, p. 3, last line-p. 5, line 14.

Competence Centre; 650, Route Des Lucioles; F-06921 Sophia-Antipolis Cedex; France, vol. RAN WG2, No. San Francisco, USA; 20100222, Feb. 15, 2010, XP050421681, [retrieved on Feb. 15, 2010], p. 1, line 1-line 26, p. 3, last line-p. 5, line 14.

* cited by examiner

USER DEVICE DORMANCY

I. CLAIM OF PRIORITY

The present application claims priority from U.S. Provisional Patent Application No. 61/367,160 filed on Jul. 23, 2010, the contents of which are expressly incorporated herein by reference in their entirety.

II. FIELD

The present disclosure is generally related to wireless communication systems.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities. Reducing unneeded power consumption in such devices is desirable to prolong battery life and thus enhance a user experience.

IV. SUMMARY

A communication device such as a mobile phone may send a message to an access network indicating that a data session has ended. After a time period has passed following sending the message, the communication device may determine whether to re-send the message. For example, a modem of the communication device may determine whether data has been transferred during the time period via a wireless channel that supported the data session. If no data was transferred during the time period, the message may be re-sent. As another example, an indication of whether the mobile device is in an active state or in a low-power state may be provided to an application associated with the data session and the application may determine whether to re-send the message.

In a particular embodiment, a method is disclosed. The method includes sending a message from a communication device to a radio network controller. The message indicates that a data session has ended. The data session is supported by a wireless channel between the communication device and the radio network controller. The method also includes, after a time period following the sending of the message, selectively sending a second message to the radio network controller. The second message indicates that the data session has ended. The second message is selectively sent based at least in part on whether a measurement indicates that data was communicated via the wireless channel during the time period.

In another particular embodiment, an apparatus is disclosed that includes a modem configured to generate a message to be sent from a communication device to a radio network controller. The message indicates that a data session has ended. The data session is supported by a wireless channel between the communication device and the radio network controller. The modem is further configured, after a time period following the sending the message, to selectively provide a second message to be sent to the radio network controller. The second message indicates that the data session has ended. The second message is selectively provided based at least in part on whether a measurement indicates that data was communicated via the wireless channel during the time period.

In another particular embodiment, the method includes receiving a dormancy request from an application executing at a communication device. The method also includes, in response to the dormancy request, sending a message from the communication device to a radio network controller. The message indicating that a data session has ended. The method further includes, after expiration of a time period following sending of the message, providing state information to the application. The state information indicates whether the communication device is in a low-power state.

In another particular embodiment, the apparatus includes a modem configured to receive a dormancy request from an application executing at a communication device and to generate a message to be sent from the communication device to a radio network controller in response to the dormancy request. The message indicates that a data session has ended. The modem is further configured to provide state information to the application after expiration of a time period following sending of the message. The state information indicates whether the communication device has transitioned to a low-power state.

In another embodiment, the method includes sending a dormancy request to a modem of a communication device. The method also includes receiving state information from the modem indicating whether the communication device is in an active state or a low-power state. The method further includes, in response to the state information indicating that the communication device is in the active state, selectively sending a second dormancy request to the modem.

In another embodiment, an apparatus is disclosed that includes an application processor configured to send a dormancy request to a modem of a communication device and in response to receiving state information from the modem indicating that the communication device has not transitioned to a low-power state, selectively send a second dormancy request to the modem.

One particular advantage provided by at least one of the disclosed embodiments is reduced power consumption at a communication device by selectively re-sending a message to cause a network to transition the communication device to a low-power state after a data session has ended. For example, a first message from the communication device may be lost by the network. By re-sending the message, the communication device may transition to the low-power state faster than a conventional device that waits for network usage timers to expire before transitioning to a low-power state.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
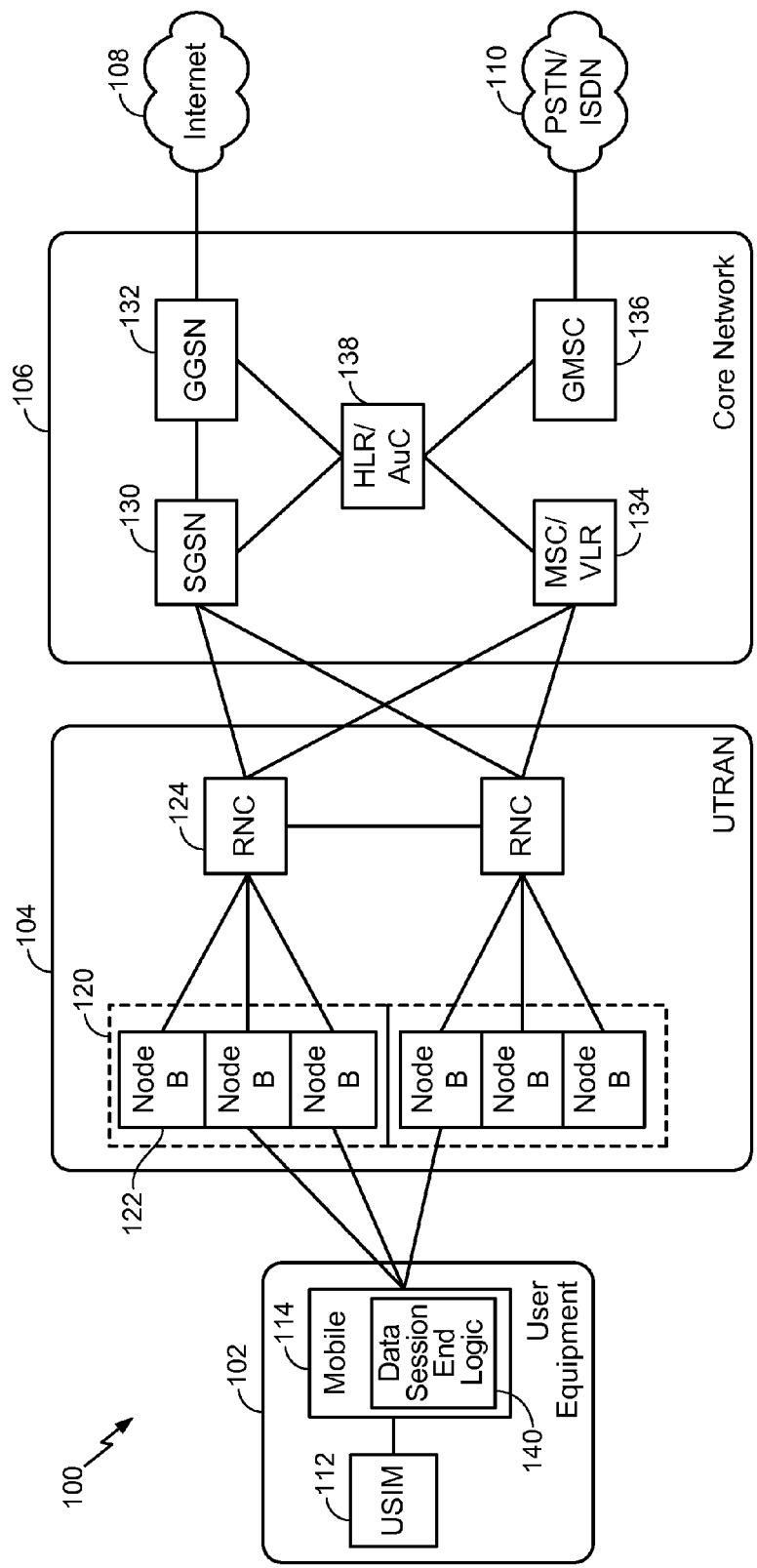
FIG. 1 is a block diagram of a particular illustrative embodiment of a communication system including a device with data session end logic.

Referring to FIG. 1, a first embodiment of a communication system is depicted and designated 100. The system 100 includes user equipment 102 in communication with an access network 104, such as a universal mobile telecommunications system (UMTS) terrestrial radio access network (UTRAN). The access network 104 is coupled to a core network 106. The core network 106 is coupled to a packet-switched network, such as the internet 108, and is coupled to one or more other networks, such as a public switched telephone network (PSTN) and/or an integrated services digital network (ISDN) 110.

The user equipment 102 includes a module 112 that may identify a user's subscription information, such as a universal subscriber identity module (USIM) coupled to a communication device 114. The communication device 114 may be a mobile phone such as a smart phone. As other examples, the communication device 114 may be a fixed station, a data terminal, or another type of communication device. The communication device 114 includes data session end logic 140. The user equipment 102 is configured to implement the data session end logic 140 to enable reduced power consumption by sending a first request that requests a dormancy state of the communication device 114 and by determining whether to re-request the dormancy state after the first request has been sent to the access network 104. For example, the data session end logic 140 may monitor channel activity during a predetermined time period after sending the first request or may indicate a power state of the communication device 114 via power state status logic to generate messages to an application at the communication device 114 indicating whether the communication device 114 is in a low power state or in an active state. By re-sending the request for a dormancy state, the communication device 114 may be able to enter a low-power state even if an error occurred during transmission of the first request.

The access network 104 includes wireless communication equipment such as radio equipment to enable the communication device 114 to access the core network 106. The access network 104 includes multiple regions, such as registration areas, including a representative registration area 120. Each of the regions includes multiple nodes, such as a representative Node B 122. Each of the nodes may include receiver and transmitter equipment to communicate with user devices and is coupled to a radio network controller, such as a representative radio network controller (RNC) 124.

The core network 106 is coupled to the access network 104 via communication paths between the RNCs and various components of the core network 106, such as a serving general packet radio service (GPRS) support node (SGSN) 130 and a mobile services switching center (MSC)/visitor location register (VLR) 134. The SGSN 130 is coupled to a home location register (HLR)/authentication center (AuC) 138. The HLR/AuC 138 is also coupled to the MSC/VLR 134, to a gateway GPRS support node (GGSN) 132, and to a gateway mobile switching center (GMSC) 136. The GGSN 132 is coupled to the internes 108 and the GMSC 136 is coupled to the PSTN/ISDN 110. The core network 106 includes switching and routing capability for connecting the user equipment 102 to the PSTN 110 (for circuit-switched calls) or to a packet data network (for packet-switched calls), for mobility and subscriber location management, and for authentication services.

In a particular embodiment, the system 100 is a UMTS system and signaling is performed in accordance with a signaling protocol stack that is divided into access stratum (AS) and non-access stratum (NAS).

The non-access stratum (NAS) architecture may include connection management that handles circuit-switched calls and includes sublayers. The NAS may be responsible for call control (e.g., establish, release), supplementary services (e.g., call forwarding, 3-way calling), and short message service (SMS). The NAS may include session management that handles packet-switched calls. The NAS may include mobility management that handles location updating and authentication for circuit switched (CS) calls. The NAS may include GPRS mobility management that handles location updating and authentication for packet switched (PS) calls.

The Access Stratum (AS) architecture may include radio resource control (RRC) protocols that are defined between the UE 102 and the RNC 124 to handle establishment, release, and configuration of radio resources. The AS may include radio link control (RLC) protocols that are defined between the UE 102 and the RNC 124 to provide segmentation, re-assembly, duplicate detection, and other traditional layer-2 functions. The AS may include medium access control (MAC) protocols that are defined between the UE 102 and the RNC 124 to multiplex user plane and control plane data. The AS may include physical layer protocols that are defined between the UE 102 and the Node B to transfer data over a radio link. The interface between the UE 102 and the RNC 124 at the physical layer may handle macrodiversity combining and splitting functions.

The NAS may use services provided by the RRC (upper layer of the AS). The initial direct transfer procedure may be used to establish a signaling connection. The initial direct transfer procedure is also used to carry the initial higher layer (NAS) messages over the radio interface. The downlink direct transfer procedure may be used in the downlink direction to carry NAS messages over the radio interface. The uplink direct transfer procedure may be used in the uplink direction to carry NAS messages over the radio interface belonging to a signaling connection.

Fast dormancy for packet data users is a feature introduced in a third generation partnership project (3GPP) specification, Release 8. The feature of fast dormancy offers multiple advantages. For example, fast dormancy may enable a significant reduction in an amount of time that a mobile terminal is required to remain in a connected state. Reducing time in a connected state may result in a substantial improvement to battery life. For example, an improvement in standby time of over 100% may be attained, depending on network configuration, on a UMTS device using fast dormancy to send the UE 102 to idle in existing networks. As a second example, by releasing radio resources not being used and moving the mobile terminal to an idle state, a UTRAN registration area paging channel (URA_PCH) state, or a cell paging channel (CELL_PCH) state, the network could also free up extra capacity that can be used for other users.

In the case of some applications, although the device may have completed its data transfer and not be expecting further data exchange, the device must wait for the network to transition the device from a dedicated data channel (CELL_DCH) state or fast access channel (CELL_FACH) state to idle or CELL_PCH or URA_PCH states. This delay may arise in systems without fast dormancy because the network has no way of determining whether the mobile terminal has more data to transfer and therefore keeps the mobile in data transfer states (e.g. CELL_DCH or CELL_FACH) for a much longer time period than may be necessary. The network may keep the mobile in the data transfer state for longer than may be necessary to avoid an additional setup delay for subsequent packet data transfers, in the event that there are more data packets to transfer. Because the UMTS networks cannot anticipate the data transfer characteristics of particular applications, user devices may be kept in data transfer states for longer than necessary, potentially resulting in excessive battery drain at the user device.

The UE's application layer may autonomously determine whether an application has any more data to exchange. By use of an application layer acknowledgement (for the data transfer) and application specific inactivity timers, the UE 102 may be able to determine reliably when it is appropriate to send an indication to the network that the application does not have any more data to exchange.

Fast dormancy enables the UE 102 to send this indication in a RRC signaling connection release indication (SCRI) message by including a cause value indicating ending of data transfer session to the UTRAN 104. The SCRI message including the end of data session cause value indicates that the UE 102 no longer needs the indicated signaling connection since data transfer is complete, and the network can make an informed decision on how to handle the UE 102. The network may decide to release the signaling connection, in which case the network may then decide to release the RRC connection and let the UE 102 go to idle. Alternatively, the network could keep the UE 102 in a CELL_PCH or URA_PCH state in order to attain similar battery savings while providing a faster reconfiguration for data transfer in the future. Fast dormancy thus enables the UE 102 to move from an active data transfer state to an idle state much faster than a conventional process of waiting for the network to eventually send a low-power state command.

Fast dormancy enabling the UE 102 to transition to the idle state may be enhanced by the data session end logic 140 of the UE 102. For example, the SCRI message may be sent in an un-acknowledged mode and under certain circumstances may not be received by the network or a reply by the network may not be received by the UE 102. The UE 102 may determine whether to re-send the SCRI message to request release of the signaling connection and transition to a low-power state, as described further with respect to FIGS. 2-7.

Figure 2:
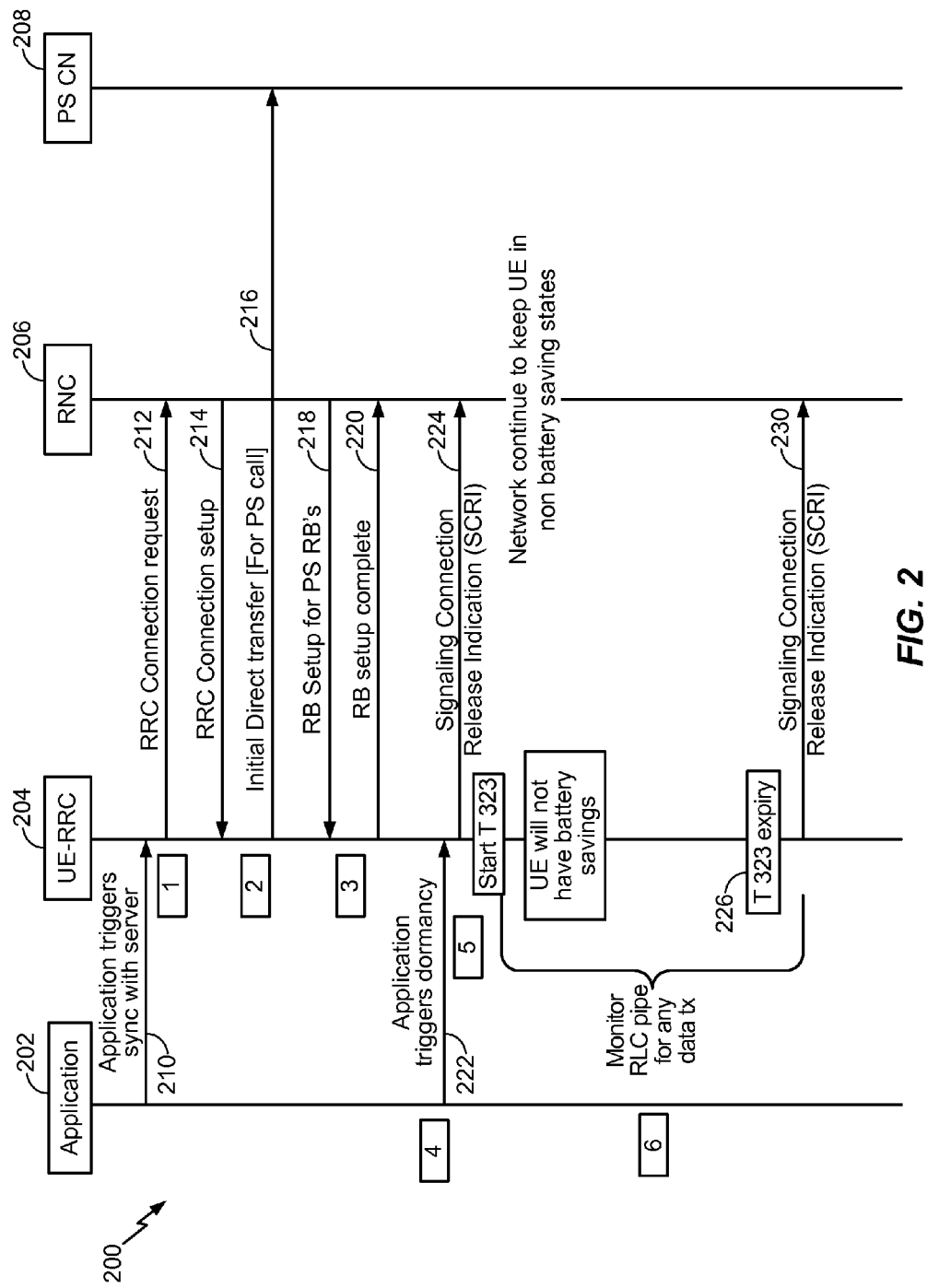
FIG. 2 is a ladder diagram of a first illustrative embodiment of a method of determining whether to re-send a message indicating that a data session has ended.

FIG. 2 illustrates a first particular embodiment of a method of determining whether to re-send a message from a communication device to a network indicating that a data session has ended. The example of FIG. 2 illustrates operation in an embodiment using fast dormancy of a UMTS network that is not responsive to an SCRI from a mobile device. Signaling is illustrated between an user application 202 and a radio resource control (RRC) of user equipment (UE) (UE-RRC) 204. The user application 202 and the UE-RRC 204 may be implemented at the UE 102 of FIG. 1. The UE-RRC 204 communicates with a radio network controller (RNC) 206 and a packet switched domain (PS CN) 208, such as the RNC 124 and the internet 108, respectively, of FIG. 1.

1. The user application 202 (for example, an email client of the UE 102 of FIG. 1 that synchronizes 210 with a server at the internet 108 of FIG. 1 once every ten minutes) makes a packet switched (PS) data call that will cause the UE-RRC 204 to send a RRC connection request message 212 that will establish a RRC connection 214.

2. The PS domain is opened by the UE sending an initial direct transfer (IDT) message 216.

3. The network sets up PS radio bearers (RB's) as part of a RB setup message 218 and the UE may send a RB setup complete message 220.

4. The user application 202 ends a data session (e.g. an email client completes receiving data from the server) and triggers a dormancy request 222 to a modem (e.g. according to a UMTS protocol) indicating that the application 202 has completed transferring data.

5. In response to the dormancy request 222, the UE-RRC layer 204 sends a RRC Signaling Connection Release Indication (SCRI) message 224 that includes a cause value indicating ending of data transfer session to the network (e.g. UTRAN). The cause value indicates that the UE no longer needs the signaling connection since data transfer is complete. A timer T323 is started. The UE may be prohibited from sending (or re-sending) the SCRI message 224 with the information element (IE) "Signaling Connection Release Indication Cause" set to "UE Requested PS Data Session End" while the timer T323 is running.

The network may decide to release the signaling connection, in which case the network may release the RRC connection and let the UE transition to the idle state. Alternatively, the network could keep the UE in the CELL_PCH or URA_PCH state to enable battery savings while also enabling a faster reconfiguration for data transfer in the future. The UE may enter a battery saving state (i.e. RRC state IDLE, CELL_PCH, or URA_PCH) in response to an instruction from the network.

However, as illustrated in FIG. 2, the network may not release the signaling connection. For example, the network may not receive the RRC Signaling Connection Release Indication (SCRI) message 224 due to bad radio conditions. According to a 3GPP specification, delivery of the SCRI message 224 is not guaranteed. As another example, the SCRI message 224 may be received but the network may not take the UE to a battery saving state after receiving the RRC Signaling Connection Release Indication (SCRI) message 224. As another example, the network may have sent a message to transition the UE to a battery saving state but the message may have been lost (e.g. a RRC connection release sent using a un-acknowledgement mode).

In these cases the UE application layer may not be aware of network actions on power saving states of the UE. Conventional applications may initially trigger the dormancy request 222 but may not be able to re-send the dormancy request to indicate that the data session is complete.

For example, an email client may trigger periodic synchronization with a server to determine if any email is to be downloaded (1), and if email is to be downloaded the email client downloads the emails (2). After detecting no data for a prolonged period (3), the email client may trigger the dormancy request 222 to the protocol layer (4) to send the SCRI 224 to the network. The application procedure may end its process (5) and may not detect "no data for prolonged period" so the application 202 may not trigger further dormancy requests to protocol layers.

6. The UE-RRC 204 may monitor a radio bearer pipe (i.e. the logical pipe that carries data to the user application 202) for any data transactions. When the user application 202 triggers the dormancy request 222 to the UE protocol, the UE-RRC 204 will send the SCRI message 224 by setting the IE "Signaling Connection Release Indication Cause" to "UE Requested PS Data Session End" to the network. The UE will remember that the application 202 requested dormancy and that the application 202 does not have any data to send.

In one embodiment, the UE starts monitoring the radio bearer pipe that carries user application data to determine if any uplink data is sent or any downlink data is received by polling on a counter "Count_C." The counter provides a number that is incremented in case any data is sent or received. In another embodiment, the UE starts monitoring the radio bearer pipe that carries user application data to determine if any uplink data is sent or any downlink data is received by polling on a RLC sequence number that is incremented in case any data is sent or received.

Upon expiry 226 of the timer T323, if the network has not transitioned the UE to a battery saving state (i.e. the UE does not have battery savings from transitioning to a low-power state), the UE checks whether there is any activity on the user radio link control (RLC) pipe. Upon determining that there was no activity on the RLC pipe at the UE during the time period between when the T323 timer is started and the expiry 226 of the T323 time, the UE sends a SCRI message 230 to the network and starts monitoring the user RLC pipe. UE may continue repeating the SCRI send/run T323/check for inactivity process for up to N number of cycles (N is a positive integer). The UE may stop the process of polling the radio bearer pipe if the network transitions the UE to a battery saving state.

As a result, because the UE-RRC 204 monitors the radio bearer (e.g. based on Count-C or RLC sequence number), determining whether data transmission has ceased after sending the SCRI message 224 and determining whether to send the SCRI 230 may occur at the UE-RRC 204 independent of the application 202. The UE provides a centralized polling mechanism that will selectively send the SCRI 230 even if the application 202 shuts down after sending the dormancy request 222. The UE protocol may also provide efficient access to RRC state information to determine whether the UE is in a battery saving state or not.

Figure 3:
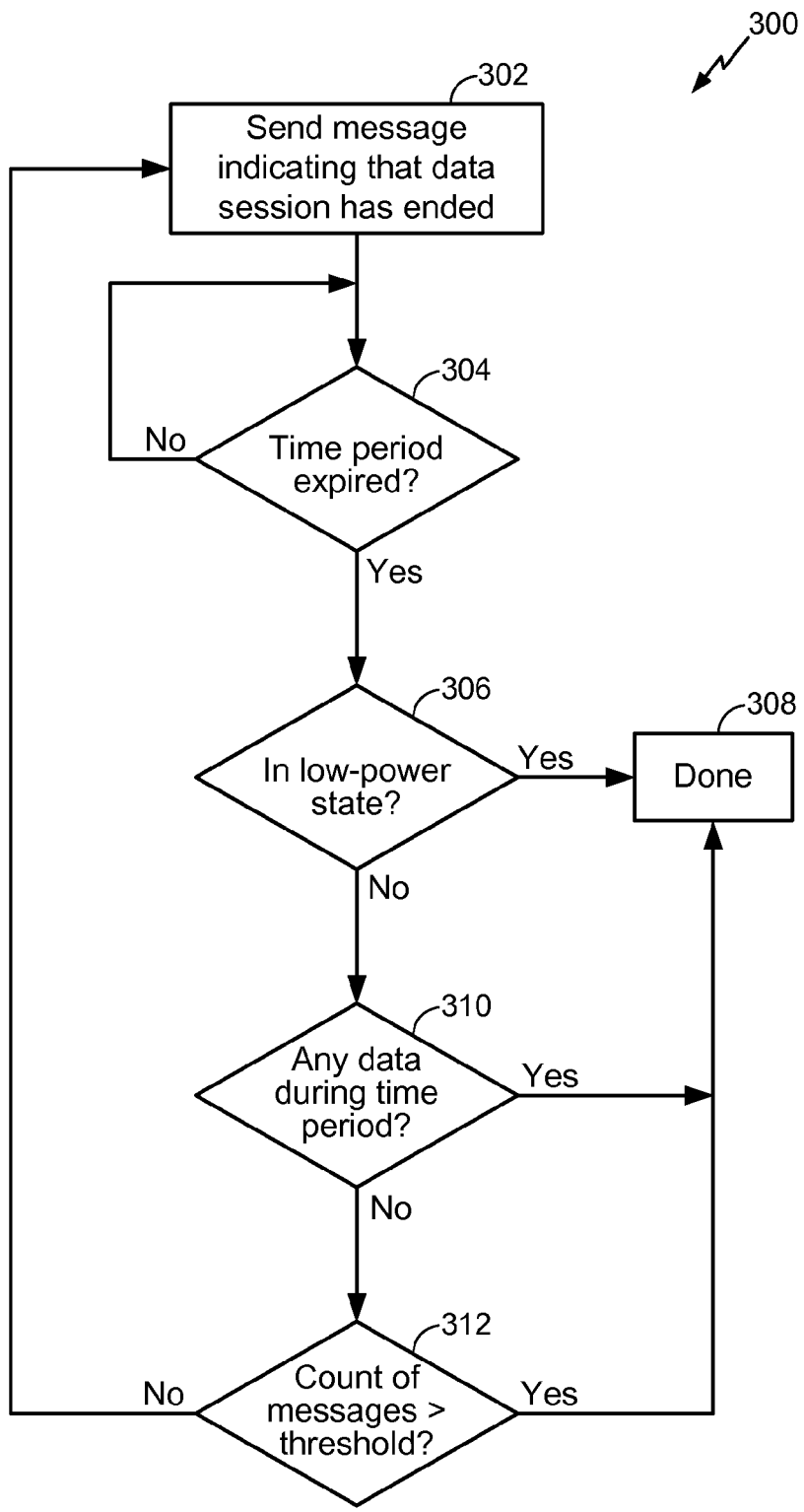
FIG. 3 is a flow diagram of a second illustrative embodiment of a method of determining whether to re-send a message indicating that a data session has ended.

FIG. 3 depicts a second illustrative embodiment of a method of selectively resending a dormancy request at a mobile device. The method 300 includes sending a message indicating that a data session has ended, at 302. For example, the message may be sent from a communication device to a radio network controller, such as a SCRI message sent from the communication device 114 of FIG. 1 to the representative radio network controller 124 of the UTRAN 104 of FIG. 1. The data session may be supported by a wireless channel between the controller and an access network, such as the radio bearer (RB) established between the UE-RCC 204 and the RNC 206 via messages 218-220 of FIG. 2.

A determination is made whether a time period has expired, at 304. For example, the time period may be a predetermined time period. To illustrate, the predetermined time period may correspond to a time period from starting a T323 timer and expiry of the T323 timer of a UMTS system. When the time period has not ended (e.g. the timer has not expired), processing returns to 304.

When the time period has ended (e.g. the timer has expired), processing advances to determinate whether the communication device is in a low power state, at 306. If the communication device is determined to be in the low-power state, at 306, the method ends, at 308. However, if the communication device is determined to not be in the low-power state at 306, processing advances to 310, where a determination is made whether a measurement indicates that data was communicated via the wireless channel during the time period.

When the measurement indicates that data was communicated during the time period, the method ends at 308. When the measurement indicates the data was not communicated by the wireless channel during the time period, a determination may be made whether a count of a number of messages sent exceeds a threshold, at 312. When the count of a number of messages sent does not exceed the threshold, at 312, processing returns to 302, where a next message is sent indicating that the data session has ended. For example, the next message may be a resending of an SCRI message. However, when the count of sent messages exceeds the threshold, at 312, the method ends at 308.

The method 300 includes sending a message from a communication device to a radio network controller. The communication device may be configurable to transition between an active state and a low-power state and the communication device is in the active state when the message is sent. The low-power state may include one or more of an idle state, a cell paging channel monitoring state (CELL_PCH), a registration area paging channel monitoring state (URA_PCH), or any combination thereof.

The message indicates that a data session between the communication device and the radio network controller has ended and may include a signaling connection release indication (SCRI) that includes a signaling connection release indication cause information element (IE) that indicates a user equipment (UE) requested packet switched (PS) data session end. The data session is supported by a wireless channel between the communication device and the radio network controller.

The wireless channel may be monitored during a time period that begins upon sending the message. An end of the time period may be determined based on expiration of a message inhibit timer (e.g. T323) that is set in response to sending the message. A value of a parameter may be modified in response to data being communicated via the wireless channel during the time period. For example, the parameter may be a count (Count-C) that is incremented in accordance with a universal mobile telecommunication service (UMTS) specification in response to detecting a protocol data unit (PDU) data communication via the wireless channel. As another example, the parameter may be a radio link control (RLC) sequence number that is incremented in accordance with a universal mobile telecommunication service (UMTS) specification and that may be provided as a sequence number in a PDU header. A first value of the parameter at a beginning of the time period may be compared to a second value of the parameter at the end of the time period to determine whether data was communicated over the wireless channel during the time period.

After expiration of the time period after sending the message, the method includes selectively sending a second message (e.g. a second SCRI, or resending the same message as the first message) to the radio network controller, the second message indicating that the data session has ended. The second message is selectively sent based on whether a measurement indicates that data was communicated via the wireless channel during the time period.

The method may include selectively sending a third or subsequent message based on a count of messages that have been sent after the data session has ended when the count of messages does not exceed a predetermined threshold. The third message indicates that the data session has ended. For example, when the count of messages does not exceed the threshold, at 312, another message may be sent indicating that the data session has ended, at 302.

As a result, if the first message is lost or if a network reply to the first message is not received, the communication device may re-send the message to the network. If the second or subsequent message is received and acted upon by the network, the communication device may be able to transition to a low-power state without having to wait for conventional time periods of non-activity before transitioning to the low-power state.

Figure 4:
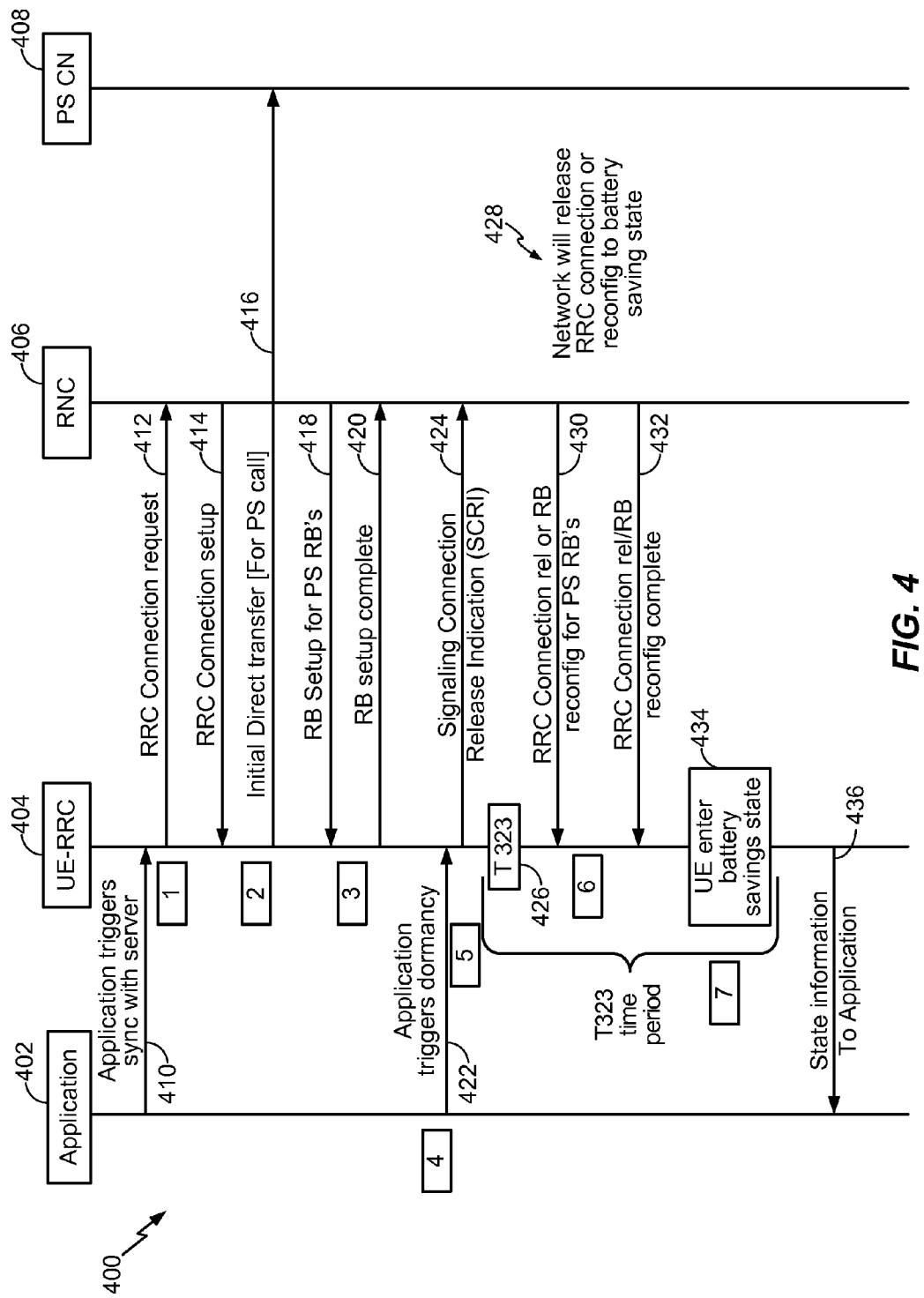
FIG. 4 is a ladder diagram of a third illustrative embodiment of a method of determining whether to re-send a message indicating that a data session has ended.

FIG. 4 illustrates a third embodiment of a method of determining whether to re-send a message indicating that a data session has ended. The example of FIG. 4 illustrates operation in an embodiment using fast dormancy of a UMTS network that is not responsive to an SCRI from a mobile device. Signaling is illustrated between a user application 402 and a radio resource control (RRC) of user equipment (UE) (UE-RRC) 404 with a radio network controller (RNC) 406 and a packet switched domain (PS CN) 408. For example, FIG. 4 may correspond to communication of the UE 102 to the internet 108 via the access network 104 of FIG. 1.

1. The user application 402 (for example, an email client that synchronizes 410 with a server once every ten minutes) makes a packet switched (PS) data call that causes the UE-RRC 404 to send a RRC connection request message 412 to establish a RRC connection 414.

2. The PS domain is opened by the UE sending an initial direct transfer (IDT) message 416.

3. The network sets up PS radio bearers (RB's) as part of a RB setup message 418 and the UE may send a RB setup complete message 420.

4. The user application 402 ends a data session (e.g. an email client completes receiving data from the server) and triggers a dormancy request 422 to a modem (e.g. according to a UMTS protocol) indicating that the application 402 has completed transferring data.

5. In response to the dormancy request 422, the UE-RRC layer 404 sends a RRC Signaling Connection Release Indication (SCRI) message 424 that includes a cause value indicating ending of data transfer session to the network (e.g. UTRAN) that the UE no longer needs the signaling connection since data transfer is complete. The UE initiates a timer T323 start 426. The UE may be prohibited from sending (or resending) the SCRI message 424 with the information element (IE) "Signaling Connection Release Indication Cause" set to "UE Requested PS Data Session End" while the timer T323 is running.

6. The network may release the signaling connection, in which case the network may release the RRC connection or reconfigure the UE to a battery saving state 428. The network may send a message 430 including a RRC connection release instruction or a RB reconfiguration instruction for PS RB's. The UE may send a message 432 indicating a RRC connection release and/or a RB reconfiguration is complete. The UE may enter a battery savings state 434.

7. At expiry of timer T323 (i.e. at the end of the time period starting upon the SCRI 424 being sent and ending upon the timer T323 expiring), the UE protocol will indicate a current RRC state 436 to the user application 402. For example, the RRC state 436 may be an active state (e.g. CELL_DCH or CELL_FACH) or a low-power state (e.g. idle, CELL_PCH, or URA_PCH). The user application 402 may receive the RCC state information and determine whether to send another dormancy request to the UE protocol (e.g., re-send the dormancy request 422).

As a result, a determination of whether to re-send the SCRI message 424 may be made by the application 402 that triggered the dormancy request rather than by the UE-RRC 404 monitoring the radio bearer (as an alternative to the embodiments of FIGS. 2-3). The embodiment illustrated in FIG. 4 enables each user application 402 to implement customized logic to determine how to respond to a failure of the network to transition the UE to a low-power state after the user application 402 sends the dormancy request 422.

Figure 5:
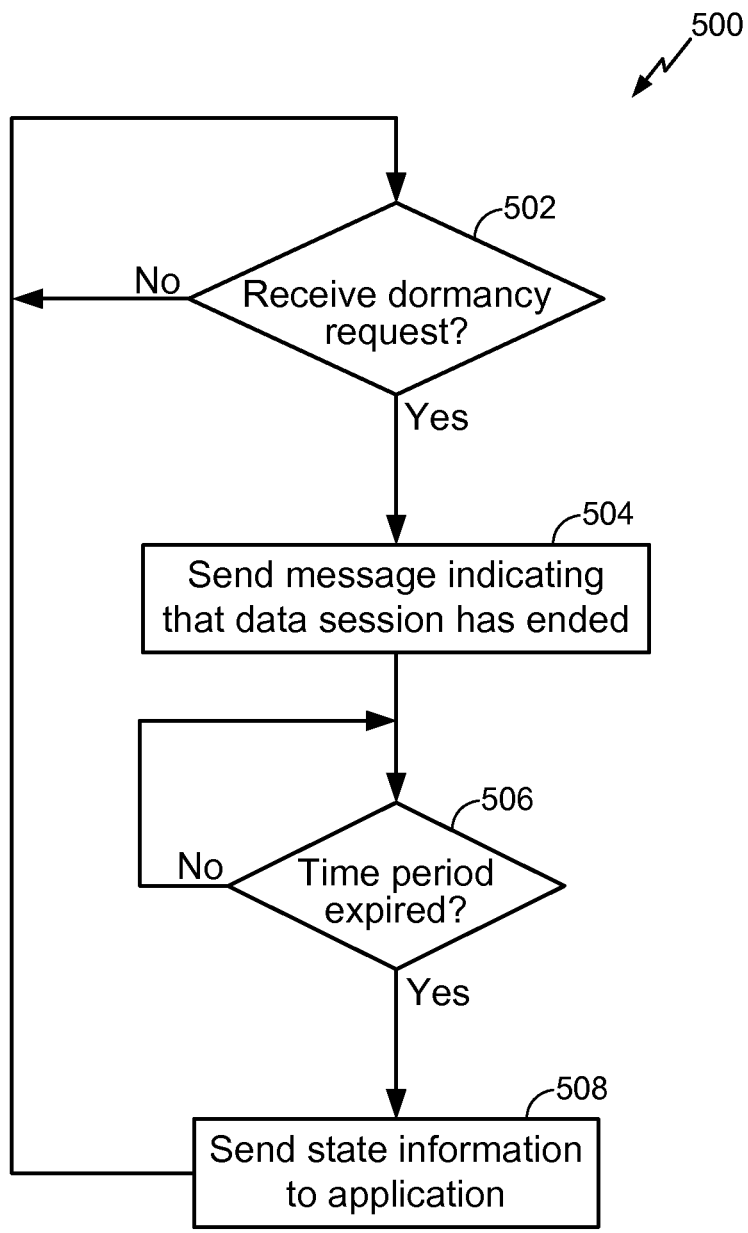
FIG. 5 is a flow diagram of a fourth illustrative embodiment of a method of determining whether to re-send a message indicating that a data session has ended.

FIG. 5 illustrates a fourth embodiment of a method of selectively resending a dormancy request. The method 500 includes determining whether a dormancy request is received from an application executing at a communication device, at 502. For example, the application may be the user application 402 of FIG. 4. When it is determined that a dormancy request is received from an application executing at the communication device, a message is sent indicating that a data session has ended, at 504. The message may be sent from the communication device to a radio network controller, such as the SCRI message 424 sent to the RNC 406 of FIG. 4. The communication device may be configurable to transition between an active state and a low-power state, and the communication device may be in the active state when the message is sent.

A determination is made whether a time period following the sending of the message has expired, at 506. For example, the time period may be the time period described with respect to FIG. 4. After the time period has ended, state information is provided to the application, at 508. The state information may indicate whether the communication device is in a low-power state. To illustrate, the state information may include an indication of a current radio resource control (RRC) state, such as an active state (e.g. CELL_DCH or CELL_FACH) or a low-power state (e.g. idle, CELL_PCH, or URA_PCH).

After sending the state information to the application, processing returns to 502, where it is determined whether a second dormancy request has been received from the application. In response to receiving a second dormancy request from the application, a second message may be sent from the communication device to the radio network controller indicating that the data session has ended.

As a result, if the first message is lost or if a network reply to the first message is not received, the application may determine to re-send the message to the network. If the second or subsequent message is received and acted upon by the network, the communication device may be able to transition to a low-power state without having to wait for conventional time periods of non-activity before transitioning to the low-power state.

Figure 6:
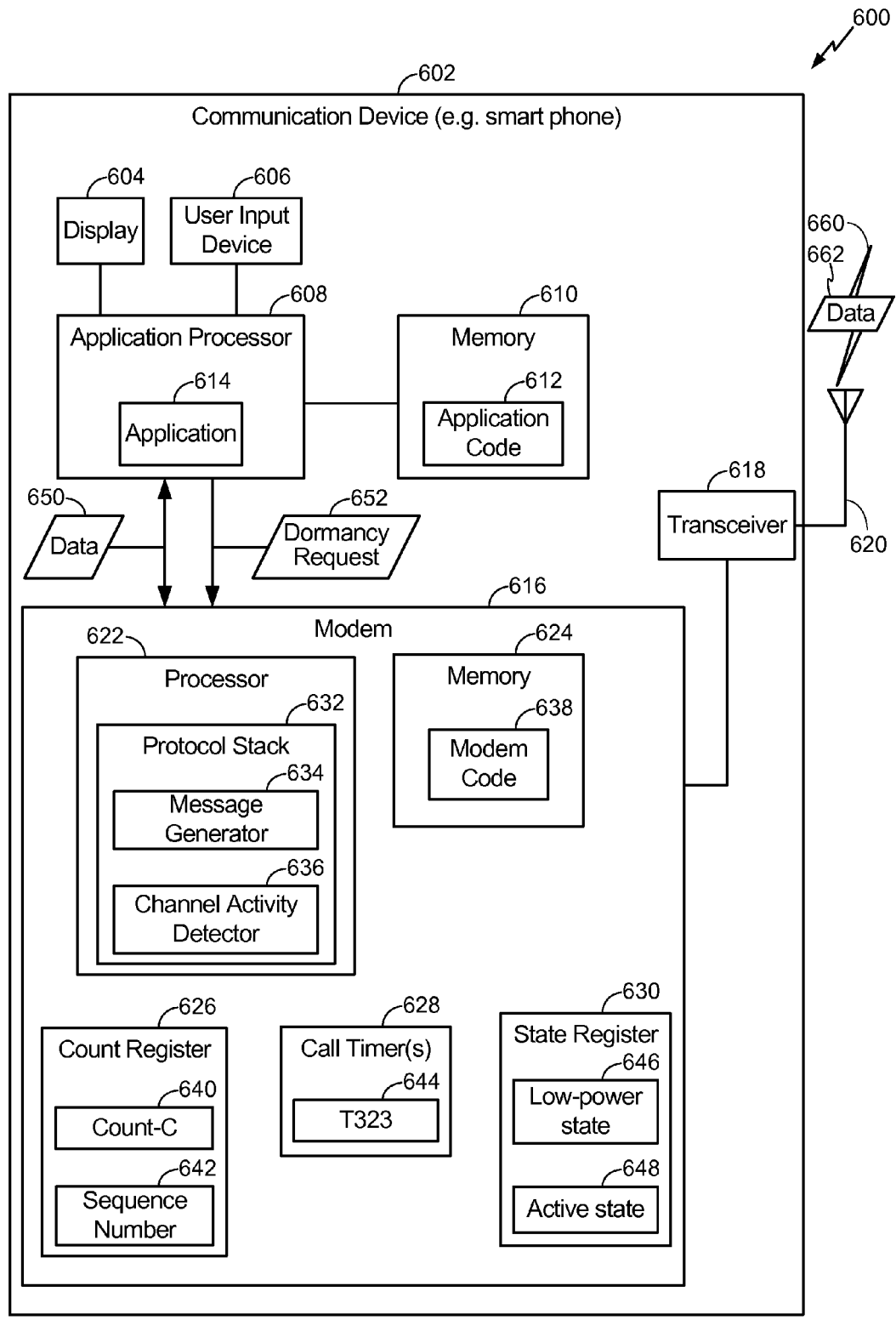
FIG. 6 is a block diagram of a first illustrative embodiment of a communication system including a device configured to selectively re-send a data session end message.

FIG. 6 illustrates a particular embodiment of a system 600 including a communication device 602, such as a smart phone. The communication device 602 includes a display device 604 and a user input device 606 operatively coupled to an application processor 608. The application processor 608 is coupled to a memory 610 and to a modem 616. The modem 616 is coupled to a transceiver 618 that is coupled to an antenna 620. The communication device 602 is configured to send and receive data 662 via a wireless channel 660. For example, the wireless channel 660 may be a radio bearer in accordance with a UMTS specification. In a particular embodiment, the communication device 602 may correspond to the UE 102 of FIG. 1 and may be configured to selectively re-send a message indicating an end of a data session according to the method of FIG. 2 or FIG. 3.

The modem 616 includes a processor 622 running a protocol stack 632 that enables communication via the wireless channel 660. The modem 616 may be configured to implement the data session end logic 140 of FIG. 1. For example, the modem 616 may be configured to operate in accordance with the UE-RRC 204 of FIG. 2. As another example, the modem 616 may be configured to operate in accordance with the method 300 of FIG. 3.

The protocol stack 632 may include a message generator module 634 and a channel activity detector 636. The modem 616 also includes a memory 624 that stores modem code 638. For example, the modem code 638 may include processor executable instructions that are executable by the processor 622 to implement part or all of the protocol stack 632. For example, the modem code 638 may include instructions that are executable by the processor 622 to generate one or more messages by the message generator 634. As another example, the modem code 638 may be executable by the processor 622 to determine data is transmitted or received via the channel 660 via the channel activity detector 636. The channel activity detector 636 may be configured to detect data transfer during a time period following sending a message indicating the end of a data session.

The modem 616 includes a one or more registers, such as a count register 626. The count register 626 may include a first value Count-C 640, a second value indicating a sequence number 642, or a combination thereof. For example, the Count-C value 640, the sequence number 642, or both may be incremented in response to detecting a data transmission being sent via the wireless channel 660 or received from the communication channel 660. The Count-C value 640 and the sequence number 642 may be maintained and incremented according to a UMTS protocol and may be polled to determine whether data has been transferred during a time period following sending a message indicating the end of a data session.

The modem 616 includes one or more call timers 628. For example, the modem 616 includes a T323 timer 644. The modem 616 also includes one or more state registers 630. For example, the state register 630 may store one or more values that indicate whether the modem is in a low power state 646 or an active state 648. To illustrate, the low power state may include one or more of an idle state, a cell paging channel monitoring state (CELL_PCH), a registration area paging channel monitoring state (URA_PCH), or any combination thereof.

The application processor 608 may be configured to execute one or more applications, such as a representative application 614. To illustrate, the application 614 may include a web browser, an audio or video playback device application, one or more user applications or database synchronization software. The application processor 608 may implement the application 614 by execution of application code 612 from the memory 610. For example, the application code 612 may include processor executable instructions that are executable by the application processor 608 to implement the application 614.

During operation, the application 614 may be configured to communicate data 650 to the modem 616 during a data session with a remote device, such as a remote server, and in response the modem 616 may transmit one or more packets of data 662 via the wireless channel 660. To illustrate, the application 614 may implement a data session with a remote data server to send and receive one or more bursts of data packets via the data channel 660. In response to the application 614 determining that the data session has ended, the application 614 may generate a dormancy request 652 that is sent to the modem 616. The modem 616 may receive the dormancy request 652 and in response the message generator 634 may generate a message to be transmitted to an access network, such as to the RNC 124 of FIG. 1, indicating that the data session has ended and/or requesting the modem to be transferred to the low-power state 646. For example, the message generator 634 may generate a SCRI message.

After sending the message, the channel activity detector 636 may poll the count register 626 to determine a value of Count-C 640, a value of the sequence number 642, or a combination thereof. In addition, the T323 timer 644 may be started when the message is sent. Upon expiry of the T323 timer 644, the channel activity detector 636 may determine by accessing the state register 630 whether the communication device 602 is in the low power state 646. In addition, the channel activity detector 636 may poll the count register 626 to determine another value of Count-C 640 or the sequence number 642. Upon determining that the communication device 602 is in the low power state 646, the protocol stack 632 may be configured to recognize that the wireless channel 660 has been closed.

However, upon determining that the communication device 602 is not in the low power state 646 and instead is in an active state 648, the message generator 634 may be configured to resend the message (e.g. the SCRI message), or to send a second message (e.g. a second SCRI message) indicating that the data session has ended. To illustrate, the channel activity detector 636 may poll the count register 626 upon completion of the T323 timer 644. Upon detecting that a value of the Count-C parameter 640 at the expiration of the T323 timer 644 differs from an initial value of the Count-C parameter 640 (when the message is sent), the channel activity detector 636 may determine that the wireless channel 660 is still in use, and rules or logic associated with the protocol stack 632 may determine that a second message indicating that the data session has ended should not be sent. As another example, the channel activity detector 636 may perform a similar comparison of values of the sequence number 642 to determine whether data is communicated via the wireless channel 660 during a time period of the T323 timer 644. In response to the channel activity detector 636 determining that no data has been communicated via the wireless channel 660 during a time period associated with the T323 timer 644, the message generator 634 may resend the message to the access network indicating the data session has ended.

Therefore, if the message was not delivered to the network or if a network reply to the first message is not received, the communication device 602 can re-send the message to the network. The communication device 602 may be able to transition to a low-power state without having to wait for conventional time periods of non-activity before transitioning to the low-power state.

Figure 7:
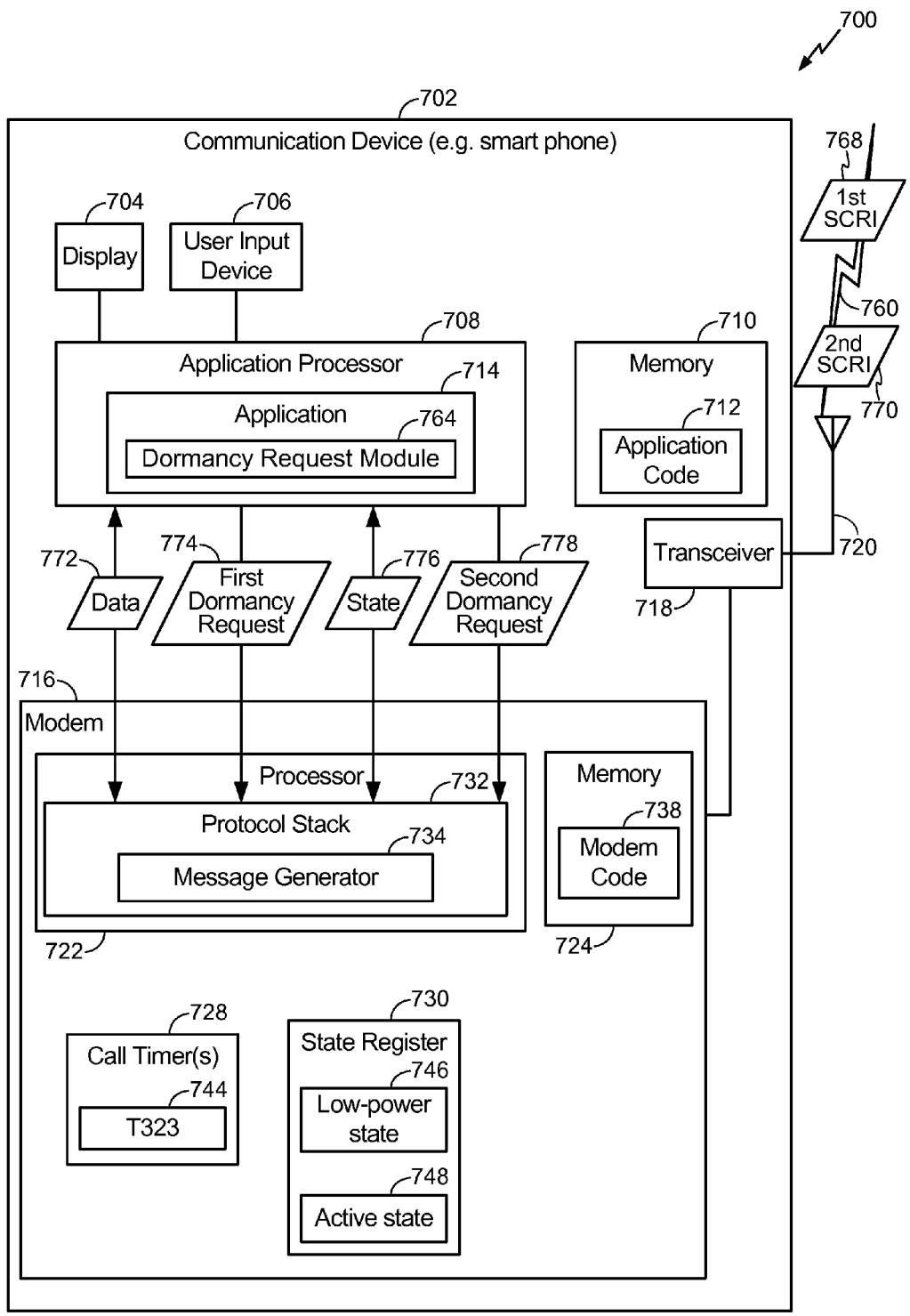
FIG. 7 is a block diagram of a second illustrative embodiment of a communication system including a device configured to selectively re-send a data session end message.

Referring to FIG. 7, a system 700 is depicted that includes a communication device 702 with access to a wireless channel 760. The communication device 702 includes a display device 704 and a user input device 706 operatively coupled to an application processor 708. The application processor 708 is configured to implement an application 714 by executing application code 712 at a memory 710. For example, the memory 710 may be a non-transient tangible storage medium storing processor executable instructions. The application processor 708 is coupled to a modem 716. The modem 716 enables communication via the wireless channel 760 using a transceiver 718 and an antenna 720.

The modem 716 includes a processor 722, a memory 724, one or more call timers 728, and a state register 730. The modem 716 may be configured to implement the data session end logic 140 of FIG. 1. For example, the modem 716 may be configured to operate in accordance with the UE-RRC 404 of FIG. 4. As another example, the modem 716 may be configured to operate in accordance with the method 500 of FIG. 5.

The processor 722 may be configured to implement a protocol stack 732. For example, the processor 722 may be configured to execute processor executable instructions such as modem code 738 stored at the memory 724. The modem code 738 may include processor executable instructions that are executable by the processor 722 to implement the protocol stack 732. The protocol stack 732 may include a message generator 734. The message generator 734 may be configured to generate one or more messages to indicate to a radio network controller of an access network, such as a SCRI message sent to the radio network controller 124 of FIG. 1, an end of a data session that is supported by the wireless channel 760.

The one or more call timers 728 may include a T323 timer 744 that is configured to indicate expiration of a predetermined duration following transmission of a SCRI message, such as a first SCRI message 768 or a second SCRI message 770. The state register 730 may be configured to record data indicating whether the communication device 702 is in a low power state 746 or an active state 748.

The application processor 708 may implement an application 714 that includes a dormancy request module 764. The dormancy request module 764 may be configured to send a first dormancy request 774 to the modem 716 in response to determining that a data session has ended. For example, the data session may be used by the application 714 to send and receive data 772 to a remote source via the wireless channel 760. Upon determination that the data session has ended, the application 714 may send the first dormancy request 774 to the protocol stack 732.

The protocol stack 732 may be configured to generate the first SCRI message 768 using the message generator 734 and to send the first SCRI message 768 via the wireless channel 760. The first SCRI 768 indicates that the data session has ended. Upon sending the first SCRI 768, the T323 timer 744 may be initiated. Upon expiration of the T323 timer 744, the protocol stack 732 may be configured to send state information 776 to the application 714 indicating a state of the communication device 702. For example, the modem 716 may provide the state information 776 by reading content of the state register 730 and by providing an indication of a current radio resource control (RRC) state to the application 714.

The application 714 may receive the state information 776 from the modem 716 indicating whether the communication device 702 is in the active state 748 or the low power state 746. When the state information 776 indicates that the communication device 702 is in the low-power state 746, the network has responded to the first SCRI 768 and the wireless channel 760 has been released, as triggered by the first dormancy request 774. In response to the state information 776 indicating that the communication device 702 is in the active state 748, the dormancy request module 764 may selectively send a second dormancy request 778 to the modem 716. For example, the second dormancy request 778 may be sent in response to a determination by the application 714 that no data is pending to be transferred via the modem 716.

Upon receiving the second dormancy request 778 at the modem 716, the message generator 734 may send the second SCRI message 770, again requesting to close the communication channel 760 and/or to be transitioned into the low power state 746.

Therefore, if the first SCRI 768 is lost or if a network reply to the first SCRI 768 is not received, the application 714 may determine to send the second SCRI 770 to the network. If the second or subsequent SCRI is received and acted upon by the network, the communication device 702 may be able to transition to the low-power state 746 without having to wait for conventional time periods of non-activity before transitioning to the low-power state 746.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g. a mobile phone). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
sending a message from a communication device to a radio network controller, the message indicating that a data session has ended, wherein the data session is supported by a wireless channel between the communication device and the radio network controller;
monitoring the wireless channel during a time period following the sending of the message, wherein a value of a parameter is modified in response to data being communicated via the wireless channel during the time period;

comparing a first value of the parameter at a beginning of the time period to a second value of the parameter at an end of the time period; and after the time period, selectively sending a second message to the radio network controller, the second message indicating that the data session has ended, wherein the second message is selectively sent based at least in part on whether a measurement indicates that data was communicated via the wireless channel during the time period.

2. The method of claim 1, wherein the message includes a signaling connection release indication (SCRI).

3. The method of claim 2, wherein the SCRI includes a signaling connection release indication cause information element (IE) that indicates a user equipment (UE) requested packet switched (PS) data session end.

4. The method of claim 1, wherein the parameter is a count (Count-C) that is incremented in accordance with a universal mobile telecommunication service (UMTS) specification in response to data being communicated via the wireless channel.

5. The method of claim 1, wherein the parameter is a radio link control (RLC) sequence number that is incremented in accordance with a universal mobile telecommunication service (UMTS) specification.

6. The method of claim 1, wherein the second message is a same message as the message.

7. The method of claim 1, wherein a third message is selectively sent based on a count of messages sent after the data session has ended not exceeding a threshold, the third message indicating that the data session has ended.

8. The method of claim 1, wherein the end of the time period is determined based on expiration of a message inhibit timer that is set in response to sending the message.

9. The method of claim 1, wherein the communication device is configurable to transition between an active state and a low-power state, and wherein the communication device is in the active state when the message is sent.

10. The method of claim 9, wherein the low-power state includes one or more of an idle state, a cell paging channel monitoring state (CELL_PCH), a registration area paging channel monitoring state (URA_PCH), or any combination thereof.

11. An apparatus comprising:
a modem configured to generate a message to be sent from a communication device to a radio network controller, the message indicating that a data session has ended, wherein the data session is supported by a wireless channel between the communication device and the radio network controller,
wherein the modem is further configured to monitor the wireless channel during a time period following sending of the message,
wherein the modem is further configured to modify a value of a parameter in response to data being communicated via the wireless channel during the time period,
wherein the modem is further configured to compare a first value of the parameter at a beginning of the time period to a second value of the parameter at an end of the time period to determine whether data was communicated over the wireless channel during the time period, and
wherein the modem is further configured to, after the time period selectively provide a second message to be sent to the radio network controller, the second message indicating that the data session has ended, wherein the second message is selectively provided based at least in part on whether a measurement indicates that data was communicated via the wireless channel during the time period.

12. The apparatus of claim 11, wherein the parameter is a count (Count-C) that is incremented in response to data being communicated via the wireless channel.

13. The apparatus of claim 11, wherein the parameter is a radio link control (RLC) sequence number.

14. A non-transitory computer-readable medium storing processor-executable instructions that are executable to cause the processor to:
generate a message to be sent from a communication device to a radio network controller, the message indicating that a data session has ended, wherein the data session is supported by a wireless channel between the communication device and the radio network controller;
monitor the wireless channel during a time period following the sending of the message;
modify a value of a parameter in response to data being communicated via the wireless channel during the time period;
compare a first value of the parameter at a beginning of the time period to a second value of the parameter at an end of the time period; and
after the time period, selectively provide a second message to be sent to the radio network controller, the second message indicating that the data session has ended, wherein the second message is selectively provided based at least in part on whether a measurement indicates that data was communicated via the wireless channel during the time period.

15. The non-transitory computer-readable medium of claim 14, wherein the parameter is a count (Count-C) that is incremented in response to data being communicated via the wireless channel.

16. The non-transitory computer-readable medium of claim 14, wherein the parameter is a radio link control (RLC) sequence number.

17. An apparatus comprising:
means for generating a first message to be sent from a communication device to a radio network controller, the message indicating that a data session has ended, wherein the data session is supported by a wireless channel between the communication device and the radio network controller, and for selectively providing a second message to be sent to the radio network controller after a time period following sending of the first message, the second message indicating that the data session has ended; and
means for determining whether data is communicated via the wireless channel during the time period by monitoring the wireless channel during the time period and modifying a value of a parameter in response to data being communicated via the wireless channel during the time period,
wherein the means for determining is configured to compare a first value of the parameter at a beginning of the time period to a second value of the parameter at an end of the time period, and
wherein the second message is selectively provided based at least in part on whether the data was communicated via the wireless channel during the time period.

18. The apparatus of claim 17, wherein the parameter is a count (Count-C) that is incremented in response to data being communicated via the wireless channel.

19. The apparatus of claim 17, wherein the parameter is a radio link control (RLC) sequence number.

20. A method comprising:
sending a message from a communication device to a radio network controller, the message indicating that a data session has ended, wherein the data session is supported by a wireless channel between the communication device and the radio network controller;
monitoring the wireless channel during a time period following the sending of the message;
performing a comparison of a first value of a parameter related to the data session at a beginning of the time period and a second value of the parameter at an end of the time period to determine whether data was communicated over the wireless channel during the time period; and
after the time period, selectively sending a second message to the radio network controller, the second message indicating that the data session has ended, wherein the second message is selectively sent based at least in part on whether the comparison indicates that data was communicated over the wireless channel during the time period.

21. The method of claim 20, wherein the value is incremented when data is communicated over the wireless channel.

22. The method of claim 20, wherein the parameter is a radio link control (RLC) sequence number.

23. An apparatus comprising:
a modem configured to generate a message to be sent from a communication device to a radio network controller, the message indicating that a data session has ended, wherein the data session is supported by a wireless channel between the communication device and the radio network controller,
wherein the modem is further configured to monitor the wireless channel during a time period following sending of the message,
wherein a value of a parameter related to the data session is modified in response to data being communicated via the wireless channel during the time period,
wherein the modem is further configured perform a comparison of a first value of the parameter at a beginning of the time period and a second value of the parameter at an end of the time period to determine whether data was communicated over the wireless channel during the time period, and
wherein the modem is further configured to, after the time period, selectively provide a second message to be sent to the radio network controller, the second message indicating that the data session has ended, wherein the second message is selectively provided based at least in part on whether the comparison indicates that data was communicated over the wireless channel during the time period.

24. The apparatus of claim 23, wherein the value is incremented when data is communicated via the wireless channel.

25. The apparatus of claim 23, wherein the parameter is a radio link control (RLC) sequence number.

* * * * *